(12) United States Patent
Weismann (10) Patent No.: US 6,665,305 B1
(45) Date of Patent: Dec. 16, 2003

(54) SYSTEM AND METHOD FOR DETECTING SUBSCRIBER LOOPS

(75) Inventor: Douglas M. Weismann, Monterey, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,301

(22) Filed: Jan. 4, 2000

(51) Int. Cl.[7] .............................................. H04L 12/28
(52) U.S. Cl. ...................................... 370/401; 370/463
(58) Field of Search ................................ 370/252, 255, 370/254, 256, 401, 400, 389, 395.1, 465, 463, 395.31

(56) References Cited

U.S. PATENT DOCUMENTS

| | | | | |
|---|---|---|---|---|
| 4,737,953 A | * | 4/1988 | Koch et al. | |
| 4,949,355 A | | 8/1990 | Dyke et al. | ................... 375/10 |
| 4,975,906 A | * | 12/1990 | Takiyasu et al. | |
| 5,014,262 A | * | 5/1991 | Harshavardhana | |
| 5,060,228 A | * | 10/1991 | Tsutsui et al. | |
| 5,150,360 A | * | 9/1992 | Perlman et al. | |
| 5,329,527 A | * | 7/1994 | Ujihashi et al. | |
| 5,394,402 A | * | 2/1995 | Ross | |
| 5,473,603 A | * | 12/1995 | Iwata | |
| 5,511,168 A | * | 4/1996 | Perlman et al. | |
| 5,732,071 A | * | 3/1998 | Saito et al. | |
| 5,798,706 A | | 8/1998 | Kraemer et al. | ....... 340/825.07 |
| 6,028,862 A | * | 2/2000 | Russell et al. | |
| 6,038,600 A | * | 3/2000 | Faulk, Jr. et al. | |
| 6,343,330 B1 | * | 1/2002 | Khanna et al. | |
| 6,411,625 B1 | * | 6/2002 | Furuhashi et al. | |
| 6,510,151 B1 | * | 1/2003 | Cioli et al. | |

FOREIGN PATENT DOCUMENTS

EP              222584          *   5/1987

* cited by examiner

*Primary Examiner*—Douglas Olms
*Assistant Examiner*—Steven A Blount
(74) *Attorney, Agent, or Firm*—Baker Botts L.L.P.

(57) ABSTRACT

A network device coupled to subscribers using a first communication network determines whether to forward communications from a particular subscriber to other components of a system based upon whether the subscriber is a part of a subscriber loop. The network device determines whether the subscriber is a part of a subscriber loop based upon the communications received from the subscriber and subscriber associations stored at the network device.

31 Claims, 4 Drawing Sheets

FIG. 1

SYSTEM AND METHOD FOR DETECTING SUBSCRIBER LOOPS

TECHNICAL FIELD OF THE INVENTION

This invention relates in general to data communication, and more particularly to a system for detecting subscriber loops.

BACKGROUND OF THE INVENTION

Communication systems support the provisioning of voice, video, multimedia, data, or other services and information to subscribers arranged in a bridged network environment. Subscriber loops may occur in the bridged network environment when there is more than one active path between two subscribers. Subscriber loops in a bridged network environment may lead to the duplication of communications in a communications system resulting in a saturation of the network. Prior attempts to control loops in a bridged network environment include implementing spanning tree protocols and/or source routing protocols. A problem with this technique is that neither protocol is adequately scaleable for certain bridge network applications.

SUMMARY OF THE INVENTION

In accordance with the present invention, the disadvantages and problems associated with prior communication systems have been substantially reduced or eliminated.

In accordance with one embodiment of the present invention, a network device comprises a first network interface coupled to a plurality of subscribers using a communication network having a plurality of virtual circuits, each subscriber associated with a physical address. The network device further comprises a memory coupled to the first network interface and operable to store a plurality of subscriber associations, each subscriber association specifying a physical address of a corresponding subscriber and one of the plurality of virtual circuits. The network device further comprises a processor coupled to the memory and a second network interface coupled to the processor. The first network interface receives a communication from a particular subscriber. The communication identifies a destination. The second network interface forwards the communication toward the destination if the processor determines that a particular subscriber association stored in the memory specifies the physical address of the particular subscriber and the virtual circuit used to receive the communication.

Another embodiment of the present invention is a method for controlling subscriber loops that includes receiving a communication from a particular one of a plurality of subscribers using a particular one of a plurality of virtual circuits associated with a communication network. The communication identifies a destination. The method continues by storing in a memory a plurality of subscriber associations, each subscriber association specifying a physical address associated with a corresponding subscriber and one of the plurality of virtual circuits. The method concludes by forwarding the communication toward the destination if a particular subscriber association specifies the physical address of the particular subscriber and/the virtual circuit used to receive the communication.

Technical advantages of the present invention include a system that detects subscriber loops among subscribers in virtual circuit bridge network applications based upon the physical addresses of the subscribers, the virtual circuits used by network devices to receive communications from the subscribers, and subscriber associations maintained by the network devices. A particular advantage is that the network devices may detect subscriber loops in the system when determining whether to forward communications received from the subscribers to other components of the system. In this respect, the subscriber loop detection operation creates negligible system impact and does not raise scaleability issues encountered by prior attempts to detect and control subscriber loops. Another advantage is that the network devices may detect subscriber loops among subscribers employing digital subscriber line technology to access a communication network.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein.

DETAILED DESCRIPTION OF THE DRAWINGS

Figure 1:
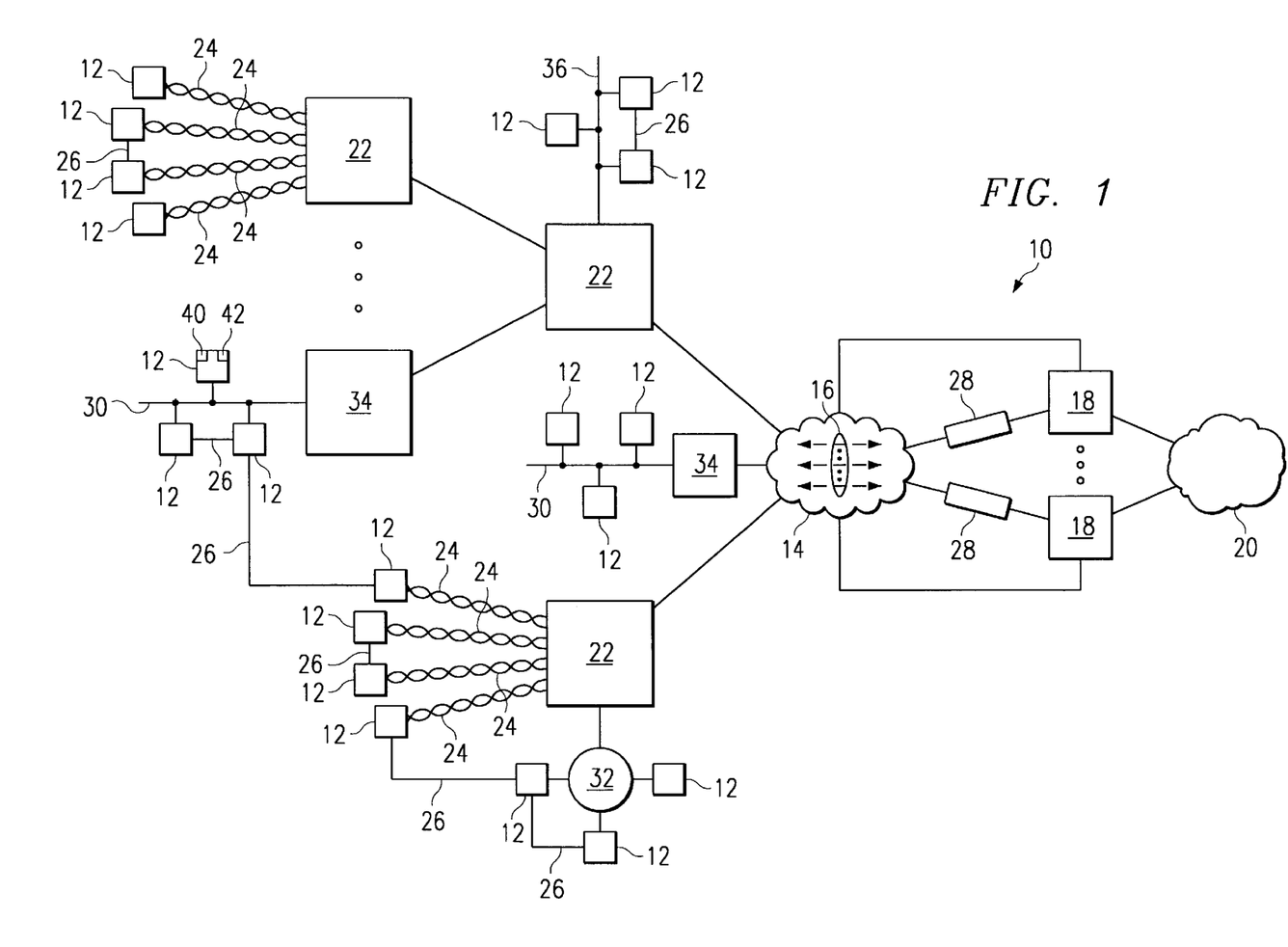
FIG. 1 illustrates a communication system according to the present invention.

FIG. 1 illustrates a communication system 10 that includes subscribers 12 coupled to network devices 18 using a first communication network 14. In general, a network device 18 detects subscriber loops 26 in system 10 based upon communications 28 received from subscribers 12 and, in response, determines whether to forward communications 28 to other components of system 10.

Subscribers 12 comprise any suitable number and combination of communication devices, such as customer premises equipment, that employ any appropriate communication techniques to communicate with network device 18 using communication network 14. A particular subscriber 12 is generally identified by other components in system 10 using addressing information associated with the particular subscriber 12. For example, a particular subscriber may be identified using a physical address 40 or a network address 42. A physical address 40 comprises a Media Access Control (MAC) Address, a Data Link Control (DLC) Address, or any other suitable hardware address that may identify a subscriber 12 to other components of system 10. A network address 42 may comprise, for example, an IP Address.

In one embodiment, subscribers 12 couple to a communication server 22 in the local loop using traditional twisted pair subscriber lines 24. Subscribers 12 and communication server 22 exchange information using high bandwidth digital subscriber line technology, referred to generally as XDSL. Communication server 22 may reside at a central office, remote terminal, or other access point in communication system 10 that allows coupling to local loops formed by twisted pair subscriber lines 24. Communication server 22 may comprise a digital subscriber line access multiplexer (DSLAM). A particular advantage of the present invention is that network device 18 may detect subscriber loops 26 among subscribers 12 employing XDSL technology to access communication network 14.

Subscribers 12 may also be associated with a local area network (LAN), such as an Ethernet network 30, a token ring network 32, a fiber distributed data interface (FDDI) network, an asynchronous transfer mode (ATM) network 36, or any other association or arrangement of subscribers 12 in a network environment (referred to generally as LAN 30). LAN 30 supports Ethernet (10 Mbps), Fast Ethernet (100 Mbps), Gigabit Ethernet, switched Ethernet, or any other suitable networking protocol or technology. LAN 30 couples to communication network 14 using communication server 22, network interface 34, or any combination of communication server 22 and network interface 34. In one embodiment, network interface 34 comprises hubs, routers, bridges, gateways, and other suitable communication devices and related software that support suitable communication protocols to couple LAN 30 to communication network 14.

Communication network 14 comprises a plurality of virtual circuits 16 that support communication between communication server 22, network interface 34, and network device 18. In a particular embodiment, communication network 14 is part of a wide area network (WAN) that supports a suitable communication technology, such as ATM, frame relay, X.25 packet switching, statistical multiplexers, switched multi-megabit data service (SMDS), high-level data link control (HDLC), serial line Internet protocol (SLIP), point-to-point protocol (PPP), transmission control protocol/Internet Protocol (TCP/IP) or any other suitable WAN protocol or technology. Although the discussion below focuses on a particular ATM embodiment of communication network 14, communication system 10 contemplates any suitable WAN protocol or technology. Furthermore, although the discussion below focuses on a particular embodiment of communication network 14 using permanent virtual connections (PVC), it should be understood that system 10 may operate using switched virtual connections (SVC) without departing from the scope of the present invention.

Network device 18 comprises any number and combination of interfaces, switches, routers, or any other suitable communication devices and related software that terminates virtual circuits 16 of communication network 14. One embodiment of a network device 18 is described in greater detail with respect to FIG. 2.

Communication network 20 comprises any combination of local area networks (LANs), wide area networks (WANs), global computer networks, hubs, routers, bridges, gateways, switches, servers, databases, or any other association of suitable wireline or wireless communication devices and networks, and related software, that provides subscribers 12 access to voice, data, multimedia, or other services and/or information. In one embodiment, a service provider associated with communication network 20, such as an Internet Service Provider (ISP), may employ one or more network devices 18 as an access server. The service provider controls subscriber loops 26 in system 10 based upon communications 28 from subscribers 12 and, in response, determines whether to forward communications 28 to network 20.

In general, system 10 assigns to each subscriber 12 and/or to each group of subscribers 12 a unique virtual circuit 16 that is to be used to communicate with network device 18. For example, system 10 may assign the same virtual circuit 16 to each subscriber 12 of a first LAN 30 and assign a unique virtual circuit 16 to each subscriber 12 of a second LAN 30. In this respect, subscribers 12 may or may not share virtual circuits 16 with other subscribers 12. When a network device 18 receives a communication 28 from a particular subscriber 12, network device 18 determines whether to forward communication 28 toward its intended destination based upon the physical address 40 of the particular subscriber 12 and the virtual circuit 16 used to receive the communication 28. In this respect, network devices 18 support detecting and controlling subscriber loops 26 in a bridged network environment.

Each virtual circuit 16 comprises a communication path between one or more subscribers 12 and a network device 18 that supports the appropriate communication technology of communication network 14. Although the following description of the present invention, is detailed with respect to virtual circuits 16 in an ATM networking environment, it should be understood that virtual circuits 16 in system 10 may be defined in any suitable networking environment using any suitable communication technologies and protocols, without deviating from the scope of the present invention.

A virtual circuit 16 in an ATM networking environment comprises a series of virtual path identifiers (VPI) and virtual channel identifiers (VCI). Together, a VPI and a VCI identify the next destination of an ATM cell as it passes through a series of communication devices in network 14 and terminates in network device 18. A unique virtual circuit 16 can therefore be assigned to each subscriber 12 or to a group of subscribers 12 by storing predetermined virtual circuit information, such as VPI and VCI information defining the virtual circuit 16, in communication server 22, network interface 34, the communication devices associated with network 14, and network device 18.

Specific virtual circuit information defining some portion of a virtual circuit 16, such as the portion of the virtual circuit 16 coupled to communication server 22 and/or communication server 34 or the portion of the virtual circuit 16 coupled to network device 18, may be used to identify uniquely the entire virtual circuit 16 to the other components of system 10, and is generally referred to as a "virtual circuit identifier." Therefore, for example, the virtual circuit identifier of a particular virtual circuit 16 may be defined using the VPI and VCI information for that portion of the virtual circuit 16 terminating in network device 18.

A problem with prior communication systems is that subscriber loops 26 may occur in a bridged network environment when there is more than one active path betweeh two subscribers 12. For example, subscriber loops 26 may occur between subscribers 12 in a particular LAN 30 or between subscribers 12 among LANS 30. Subscriber loops 26 may lead to the duplication of communications 28 in communication system 10 resulting in a saturation of communication networks 14 and/or 20. This may lead to an unstable network environment. A particular advantage of the present invention is that network device 18 supports detecting and controlling subscriber loops 26 in system 10.

In operation, communication server 22 and/or network interface 34 generates a communication 28 using information received from a particular subscriber 12. This information may include voice, video, multimedia, data, or any other suitable information; addressing information associated with the particular subscriber 12, such as a physical address 40;

virtual circuit information associated with the particular virtual circuit 16 used to transmit communication 28; and any other suitable information formatted according to any suitable protocol associated with communication network 14. One embodiment of a communication 28 is described in greater detail with reference to FIG. 3.

Network device 18 receives communication 28 from the particular subscriber 12 using a particular one of the virtual circuits 16 associated with communication network 14. Prior to forwarding communication 28 toward its intended destination, network device 18 determines whether the particular subscriber 12 is a part of a subscriber loop 26 in system 10 based upon the addressing information associated with the particular subscriber 12, such as the physical address 40 of the particular subscriber 12, and the virtual circuit information identifying the virtual circuit 16 used to receive communication 28. If subscriber 12 is determined to be a part of a subscriber loop 26, then network device 18 terminates communication 28 so that it is not forwarded. Furthermore, network device 18 may notify a network administrator, remove the particular subscriber 12 from network 14, or take some other appropriate action to control the detected subscriber loop 26. If subscriber 12 is determined not to be a part of a subscriber loop 26, then network device 18 forwards communication 28 toward its intended destination.

Figure 2:
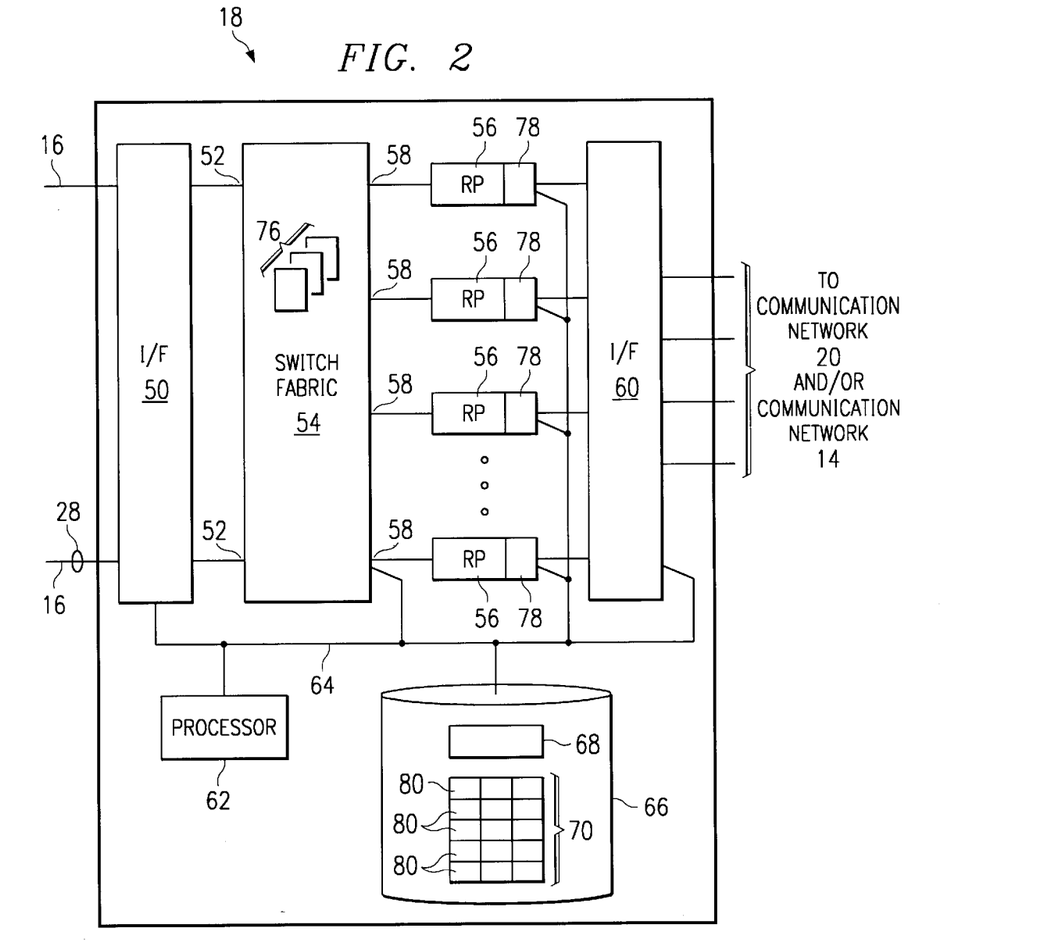
FIG. 2 illustrates one embodiment of a network device used by the system.

FIG. 2 illustrates one embodiment of network device 18 in more detail. Virtual circuits 16 of communication network 14 couple to one or more interfaces 50. Each interface 50 couples to an associated first port 52 of a switch fabric 54. A number of route processors 56 couple to second ports 58 of switch fabric 54. Route processors 56 also couple to interface 60, which in turn couples to communication network 20. In a particular embodiment, interfaces 50, switch fabric 54, route processors 56, and interface 60 reside in a single housing, rack mount, or other arrangement of integrated or separate components at a single location in communication system 10.

A processor 62 manages the overall operation of network device 18. Processor 62 may comprise a central processing unit associated with a computer system, such as a mainframe, a workstation, or any other suitable general purpose data processing facility. Processor 62 communicates information with components of network device 18 using bus 64. A memory 66 comprises any suitable volatile or non-volatile memory device associated with processor 62. Memory 66 generally stores a number of files, lists, tables, or any other arrangement of information that supports detecting and controlling subscriber loops 26 in system 10. For example, memory 66 includes program instructions 68 and loop detection table 70. Interface 50, switch fabric 54, route processors 56, and interface 60 access memory 66 directly using bus 64 or indirectly using processor 62. Alternatively, information maintained in memory 66 may reside in different components of network device 18 or in components external to network device 18.

Program instructions 68 include software code, parameters, protocols, and other instructions and data structures that processor 62 accesses and executes to detect and control subscriber loops 26 in system 10. Loop detection table 70 comprises one or more subscriber associations 80. Each subscriber association 80 specifies a physical address 40 of a corresponding subscriber 12, such as a MAC address, and one of the plurality of virtual circuits 16 used to receive a communication 28 from that particular subscriber 12.

Each interface 50 comprises any suitable combination of hardware and software components that terminate virtual circuits 16 in network device 18. In one embodiment, interface 50 arranges virtual circuits 16 into logical groups to aggregate, manipulate, or otherwise process incoming traffic from one group of virtual circuits 16 the same or differently from another group of virtual circuits 16.

Switch fabric 54 comprises any suitable combination of hardware and software components that directs, couples, and/or switches information communicated by subscribers 12 to a selected route processor 56 and/or processor 62. Switch fabric 54 maintains virtual circuit identifiers 76 reported to it by one or more components of communication network 14. Virtual circuit identifiers 76 may also reside in memory 66. Virtual circuit identifiers 76 comprise any suitable information that uniquely identifies the virtual circuit 16 upon which a particular communication 28 is received from a particular subscriber 12 by network device 18. In one embodiment, a virtual circuit identifier 76 may be defined using the VPI and VCI information for that portion of a particular virtual circuit 16 terminating in the network device 18.

Each route processor 56 comprises any suitable combination of hardware and software components that perform termination, conversion, segmentation, reassembly, addressing, and other functions supported by routers, bridges, gateways, multiplexers, and other WAN and LAN networking devices. Each route processor 56 maintains a routing table 78. Routing table 78 maintains information that allows route processor 56 to route information between communication network 14 using interface 50 and communication network 20 using interface 60 according to communication sessions established by network device 18.

Interface 60 comprises any suitable combination of hardware and software components that communicate information to other components of system 10 arranged, for example, in a bridging domain and/or in a routing domain. For example, interface 60 may communicate information to subscribers 12, communication network 14, communication network 20, or any other components of system 10, using any suitable communication protocols.

In operation, network device 18 receives a communication 28 from a particular subscriber 12 using a particular virtual circuit 16. In one embodiment, network device 18 determines from communication 28 and/or components of communication network 14 the virtual circuit information for the virtual circuit 16 upon which communication 28 was received and the addressing information of the particular subscriber 12 that communicated communication 28. For example, interface 50, switch fabric 54, and/or processor 62 may extract from communication 28 and/or components of communication network 14 a virtual circuit identifier 76 and the physical address 40 of the particular subscriber 12 that communicated communication 28.

Processor 62 determines whether to forward a particular communication 28 toward its intended destination to or to terminate communication 28 so that it is not forwarded based upon whether the subscriber 12 that originated communication 28 is a part of a subscriber loop 16. In general, processor 62 determines to forward communication 28 toward its intended destination if no subscriber associations 80 in loop detection table 70 specify the physical address 40 indicated by the communication 28; if a subscriber association 80 in loop detection table 70 specifies the physical address 40 indicated by the communication 28 but does not specify any virtual circuit 16 associated with the physical address 40; or if a subscriber association 80 in loop detection table 70 specifies the physical address 40 indicated by the communication 28 and a virtual circuit identifier 76 identifying the virtual circuit 16 used to receive communication 28. In this respect, the subscriber 12 that originated communication 28 is determined not to be a part of a subscriber loop 26. Processor 62 determines not to forward communication 28 if a subscriber association 80 in loop detection table 70 specifies the physical address 40 indicated by the communication 28 and a virtual circuit 16 other than the virtual circuit 16 used to receive the communication 28. In this respect, the subscriber 12 that originated communication 28 is determined to be a part of subscriber loop 26.

Figure 3:
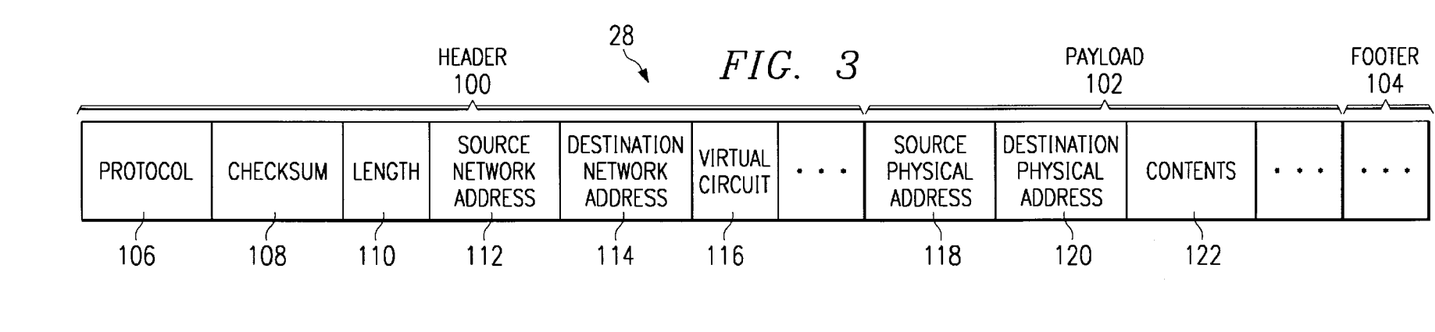
FIG. 3 illustrates one embodiment of a communication used to detect subscriber loops in the system.

FIG. 3 illustrates one embodiment of a communication 28 used to detect subscriber loops 26 in system 10. Communication 28 comprises a header 100, a payload 102, and a trailer 104. Header 100 includes any suitable information that defines the configuration and operation of communication 28 stored in any number and arrangement of information fields, such as a protocol field 106, a header checksum field 108, a length field 110, a source network address field 112, a destination network address field 114, and a virtual circuit information field 116.

Communication 28 may be formatted according to any suitable transmission protocol and technology associated with communication network 14. Protocol field 106 includes information identifying the protocol used to encapsulate and transmit communication 28. Header checksum field 108 includes information used for error detection associated with communication 28. Length field 110 includes information identifying the length of header 100 and/or communication 28. Source network address field 112 and destination network address field 114 include information identifying the network addresses, such as the IP addresses, of the source and destination of communication 28. Virtual circuit information field 116 includes information identifying the virtual circuit 16 used to transmit communication 28 in communication network 14. In one embodiment, the information in field 116 identifies the appropriate virtual circuit 16 using the VPI and VCI information for that portion of the virtual circuit 16 terminating in network device 18.

Payload 102 includes a source physical address field 118, a destination physical address field 120, and a contents field 122. Source physical address field 118 includes the physical address 40, such as the MAC address, of the subscriber 12 that originated communication 28. Destination physical address field 120 includes the physical address 40 of the destination of communication 28. It should be understood that the destination of communication 28 may be in the same or different bridging domain and/or routing domain as the source of communication 28. Contents field 122 includes voice, video, multimedia, data, or any other type of information that is communicated using communication 28. Although FIG. 3 illustrates the information in payload 102 arranged in fields 118, 120, and 122, it should be understood that this information may be included in any number and arrangement of information fields without departing from the scope of the present invention. Trailer 104 includes any suitable information used to identify the end of communication 28.

Figure 4:
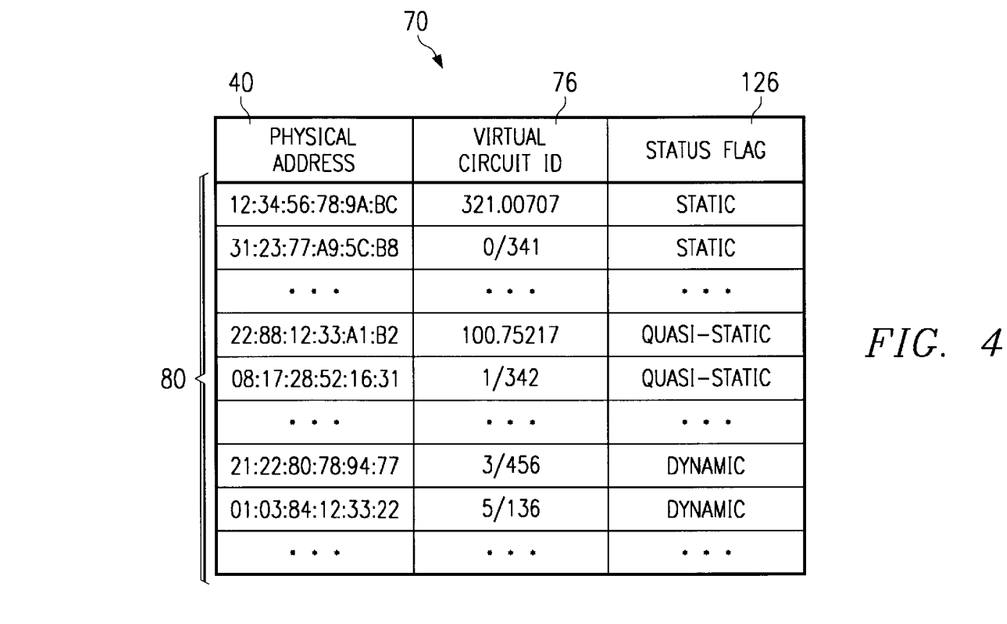
FIG. 4 illustrates one embodiment of a loop detection table used by the system.

FIG. 4 illustrates one embodiment of a loop detection table 70 used by network device 18 to detect subscriber loops 26 in system 10. Loop detection table 70 includes subscriber associations 80 for subscribers 12. Each subscriber association 80 specifies a physical address 40 of a corresponding subscriber 12 and a virtual circuit identifier 76. A status flag 126 characterizes each subscriber association 80 as "static," "quasi-static," or "dynamic."

A "static" subscriber association 80 comprises an association between a physical address 40 of a corresponding subscriber 40 and a virtual circuit identifier 76 that is created, deleted, or otherwise modified manually for that particular subscriber 12 by an administrator of network device 18. A "dynamic" subscriber association 80 comprises an association between a physical address 40 of a corresponding subscriber 12 and a virtual circuit identifier 76 that may be created, deleted, or otherwise modified dynamically for a particular subscriber 12 by network device 18 each time network device 18 receives a communication 28 from the particular subscriber 12.

A "quasi-static" subscriber association 80 comprises an association between a physical address 40 of a corresponding subscriber 12 and a virtual circuit identifier 76 that may be created, deleted, or otherwise modified dynamically for a particular subscriber 12 by network device 18, such as upon an initialization of table 70. Upon initialization of a "quasi-static" subscriber association 80 for a particular subscriber 12, network device 18 populates the contents of the subscriber association 80 using information, such as addressing and virtual circuit information, associated with the next communication 28 received by network device 18 from the particular subscriber 12. Upon receiving subsequent communications 28 from subscribers 12, network device 18 maintains intact the corresponding "quasi-static" subscriber associations 80 until the "quasi-static" subscriber associations 80 are again initialized. In this respect, "quasi-static" subscriber associations 80 support the detection of subscriber loops 26 in system 10.

In operation, network device 18 may dynamically initialize the information in loop detection table 70 such that the virtual circuit identifiers 76 for each of the "dynamic" and "quasi-static" subscriber associations 80 is cleared. In this respect, only "static" subscriber associations 80 remain intact in loop detection table 70 upon initialization by network device 18. Upon receiving a communication 28 from a particular subscriber 12, network device 18 accesses subscriber associations 80 in loop detection table 70 to detect subscriber loops 26 in system 10.

Processor 62 may generate and/or modify subscriber associations 80 in loop detection table 70 based upon the contents of subscriber associations 80 and communications 28. In particular, processor 62 may generate subscriber associations 80 for storage in loop detection table 70. For example, processor 62 generates for storage in table 70 a new subscriber association 80 specifying the physical address 40 indicated by the communication 28 and the virtual circuit 16 used to receive the communication 28 if processor 62 determines that the physical address 40 indicated by the communication 28 is not specified by any of the subscriber associations 80 already stored in loop detection table 70.

Processor 62 may also modify the contents of existing subscriber associations 80. For example, processor 62 may identify in loop detection table 70 a subscriber association 80 specifying the physical address 40 indicated by a communication 28 but not specifying a virtual circuit 16 associated with the physical address 40. Such a subscriber association 80 may be identified, for example, subsequent to initialization by network device 18, as described above. In this example, processor 62 modifies the subscriber association 80 to specify the virtual circuit 16 used to receive the communication 28, in association with the physical address 40 indicated by the communication 28.

Processor 62 determines whether to forward a communication 28 toward its intended destination based upon the contents of subscriber associations 80 and communication 28. For example, processor 62 determines to forward communication 28 if the physical address 40 indicated by communication 28 is not specified by any of the subscriber associations 80 stored in loop detection table 70. Processor 62 also determines to forward communication 28 if an existing subscriber association 40 specifies the physical address 40 indicated by the communication 28 but does not specify any virtual circuit 16 associated with the physical address 40. Processor 62 further determines to forward communication 28 if a subscriber association 80 stored in loop detection table 70 specifies the physical address 40 indicated by the communication 28 and the virtual circuit 16 used to receive the communication 28. In these situations, the subscriber 12 that originated the communication 28 is determined not to be a part of a subscriber loop 26.

Processor 62 determines not to forward communication 28 toward its intended destination if the physical address 40 indicated by communication 28 is specified in a particular subscriber association 80 of loop detection table 70 but the virtual circuit 16 used to receive communication 28 does not correspond to the virtual circuit 16 specified by the particular subscriber association 80. In this situation, the subscriber 12 that originated the communication 28 is determined to be a part of a Subscriber loop 26.

A particular advantage provided by the present invention is that network device 18 detects subscriber loops 26 in system 10 when determining whether to forward communications 28 received from subscribers 12 to other components of system 10. In this respect, the subscriber loop detection operation creates negligible system impact and does not raise scaleability issues encountered by prior attempts to detect and control subscriber loops 26.

Figure 5:
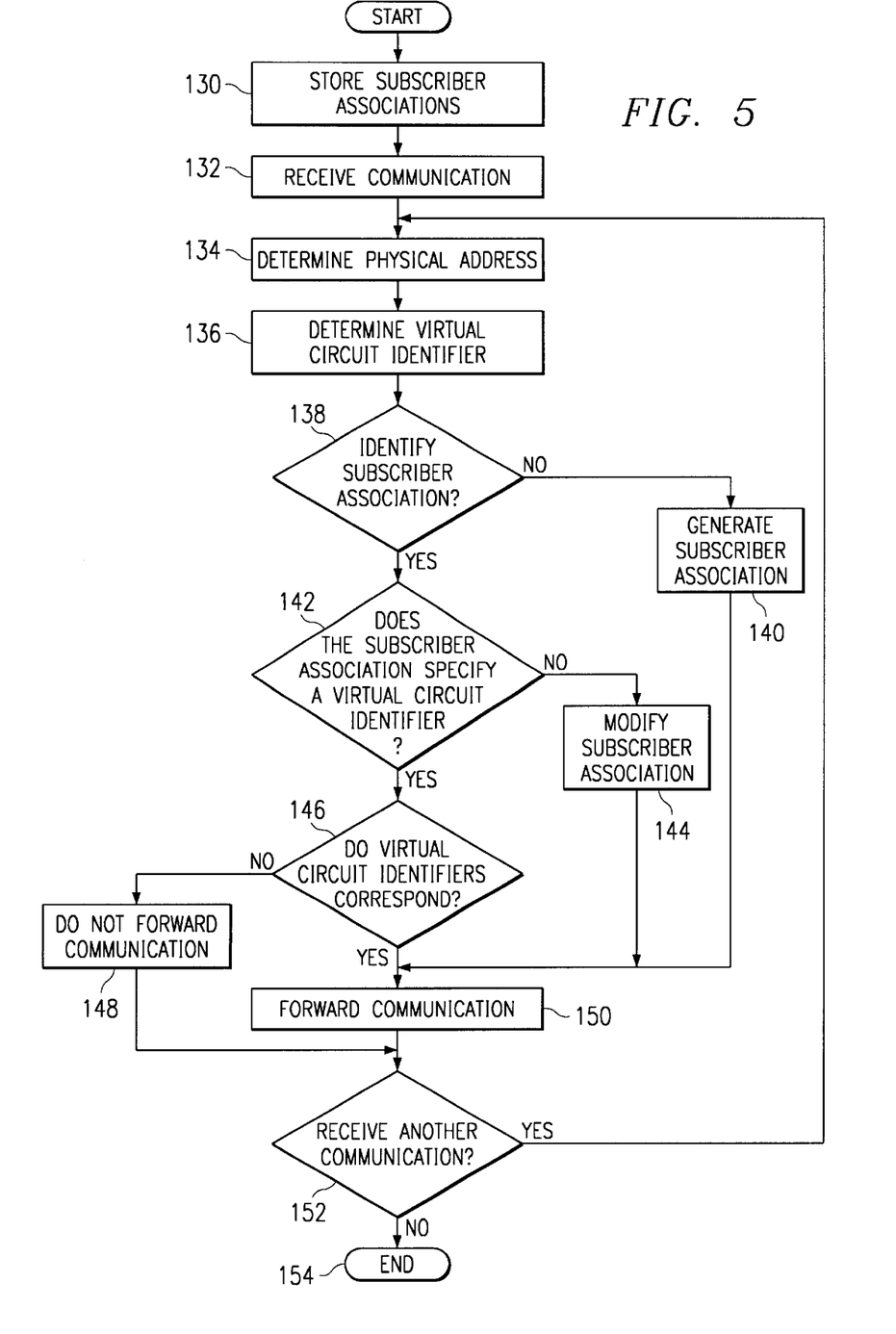
FIG. 5 illustrates a flowchart of an exemplary method for detecting subscriber loops according to the present invention.

FIG. 5 illustrates one embodiment of a method for detecting subscriber loops 26 in system 10. The method begins at step 130 where memory 66 of network device 18 stores subscriber associations 80 in loop detection table 70. Each subscriber association 80 specifies a physical address 40 of a corresponding subscriber 12 and a virtual circuit identifier 76. Network device 18 receives a communication 28 from a particular subscriber 12 at step 132. Network device 18 determines the physical address 40 of the particular subscriber 12 at step 134. Execution proceeds to step 136 where network device 18 determines the virtual circuit identifier 76 that identifies the virtual circuit 16 upon which communication 28 was received at step 132.

Processor 62 of network device 18 determines whether a subscriber association 80 for the particular subscriber 12 is stored in memory 66, at step 138. In particular, processor 62 accesses subscriber associations 80 according to the physical address 40 determined at step 134. If none of the subscriber associations 80 stored in memory 66 specify the physical address 40 determined at step 134, execution proceeds to step 140 where processor 62 generates an appropriate subscriber association 80 for the corresponding subscriber 12. The subscriber association 80 generated at step 140 includes the physical address 40 of the particular subscriber 12 determined at step 134 and the virtual circuit identifier 76 determined at step 136. Execution then proceeds to step 150 where network device 18 forwards the communication 28 received at step 132 toward its intended destination.

If a subscriber association 80 stored in memory 76 specifies the physical address 40 determined at step 134, as determined at step 138, execution proceeds to step 142. At step 142, processor 62 determines whether the particular subscriber association 80 specifies a virtual circuit identifier 76. If not, execution proceeds to step 144 where processor 62 modifies the subscriber association 80 to specify the virtual circuit identifier 76 determined at step 136. Execution then proceeds to step 150 where network device 18 forwards the communication 28 received at step 132 toward its intended destination. If the particular subscriber association 80 specifies a virtual circuit identifier 76, as determined at step 142, execution proceeds to step 146.

At step 146, processor 62 determines whether the virtual circuit identifier 76 specified by the particular subscriber association 80 corresponds to the virtual circuit identifier 76 determined at step 136. If not, processor 62 determines not to forward communication 28 at step 148. If so, execution proceeds to step 150 where network device 18 forwards the communication 28 received at step 132 toward its intended destination. Execution then proceeds to step 152 where processor 62 determines whether network device 18 receives another communication 28 from another subscriber 12. If so, execution returns to step 134. If not, execution terminates at step 154.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A network device for detecting subscriber loops, comprising:
   a first network interface coupled to a plurality of subscribers using a communication network having a plurality of virtual circuits, each subscriber associated with a physical address;
   a memory coupled to the first network interface and operable to store a plurality of subscriber associations, each subscriber association specifying a physical address of a corresponding subscriber and one of the plurality of virtual circuits;
   a processor coupled to the memory; and
   a second network interface coupled to the processor;
   wherein the first network interface is operable to receive a communication from a source subscriber, the communication identifying a destination, and the second network interface is operable to forward the communication toward the destination if the processor determines that a particular subscriber association stored in the memory specifies the physical address of the source subscriber and the virtual circuit used to receive the communication.

2. The network device of claim 1, wherein the processor is operable to generate for storage in the memory a subscriber association specifying the physical address of the source subscriber and the virtual circuit used to receive the communication if the processor determines that the physical address of the source subscriber is not specified by any of the subscriber associations already stored in the memory.

3. The network device of claim 1, wherein the second network interface is further operable to forward the communication toward the destination if the physical address of the source subscriber is not specified by any of the subscriber associations stored in the memory.

4. The network device of claim 1, wherein the second network interface is further operable to forward the communication toward the destination if a particular subscriber association specifies the physical address of the source subscriber and does not specify any of the plurality of virtual circuits.

5. The network device of claim 1, wherein the second network interface does not forward the communication toward the destination if the physical address of the source subscriber is specified by a particular subscriber association stored in the memory and the virtual circuit used to receive the communication does not correspond to the virtual circuit specified by the particular subscriber association.

6. The network device of claim 1, wherein the communication network comprises a first communication network and the destination is associated with a second communication network.

7. The network device of claim 1, wherein the source subscriber comprises a first subscriber and the destination is associated with a second subscriber.

8. The network device of claim 1, wherein the communication indicates the physical address of the source subscriber and the virtual circuit used to receive the communication.

9. The network device of claim 1, wherein the communication network comprises an Asynchronous Transfer Mode network and each virtual circuit is identified using a virtual path identifier and a virtual channel identifier.

10. The network device of claim 1, wherein the physical address for each subscriber comprises a MAC address.

11. A method for controlling subscriber loops, comprising:
  receiving a communication from a source subscriber using a particular one of a plurality of virtual circuits associated with a communication network, the communication identifying a destination;
  storing in a memory a plurality of subscriber associations, each subscriber association specifying a physical address associated with a corresponding subscriber and one of the plurality of virtual circuits; and
  forwarding the communication toward the destination if a particular subscriber association specifies the physical address of the source subscriber and the virtual circuit used to receive the communication.

12. The method of claim 11, further comprising generating for storage in the memory a subscriber association specifying the physical address of the source subscriber and the virtual circuit used to receive the communication if the physical address of the source subscriber is not specified by any of the subscriber associations already stored in the memory.

13. The method of claim 11, further comprising forwarding the communication toward the destination if the physical address of the source subscriber is not specified by any of the subscriber associations stored in the memory.

14. The method of claim 11, further comprising forwarding the communication toward the destination if a particular subscriber association specifies the physical address of the source subscriber and does not specify any of the plurality of virtual circuits.

15. The method of claim 11, further comprising terminating the communication if the physical address of the source subscriber is specified by a particular subscriber association stored in the memory and the virtual circuit used to receive the communication does not correspond to the virtual circuit specified by the particular subscriber association.

16. The method of claim 11, wherein the communication network comprises a first communication network and the destination is associated with a second communication network.

17. The method of claim 11, wherein the source subscriber comprises a first subscriber and the destination is associated with a second subscriber.

18. The method of claim 11, wherein the communication indicates the physical address associated with the source subscriber and the virtual circuit used to receive the communication.

19. The method of claim 11, wherein the communication network comprises an Asynchronous Transfer Mode network and each virtual circuit is identified using a virtual path identifier and a virtual channel identifier.

20. The method of claim 11, wherein the physical address for each subscriber comprises a MAC address.

21. A computer program for controlling subscriber loops, the program encoded on a computer-readable medium and operable to execute the following steps:
  receiving a communication from a source subscriber using a particular one of a plurality of virtual circuits associated with a communication network, the communication identifying a destination;
  storing in a memory a plurality of subscriber associations, each subscriber association specifying a physical address associated with a corresponding subscriber and one of the plurality of virtual circuits; and
  forwarding the communication toward the destination if a particular subscriber association specifies the physical address of the source particular subscriber and the virtual circuit used to receive the communication.

22. The computer program of claim 21, further comprising generating for storage in the memory a subscriber association specifying the physical address of the source subscriber and the virtual circuit used to receive the communication if the physical address of the source subscriber is not specified by any of the subscriber associations already stored in the memory.

23. The computer program of claim 21, further comprising forwarding the communication toward the destination if the physical address of the source subscriber is not specified by any of the subscriber associations stored in the memory.

24. The computer program of claim 21, further comprising forwarding the communication toward the destination if a particular subscriber association specifies the physical address of the source subscriber and does not specify any of the plurality of virtual circuits.

25. The computer program of claim 21, further comprising terminating the communication if the physical address of the source subscriber is specified by a particular subscriber association stored in the memory and the virtual circuit used to receive the communication does not correspond to the virtual circuit specified by the particular subscriber association.

26. The computer program of claim 21, wherein the communication network comprises a first communication network and the destination is associated with a second communication network.

27. The computer program of claim 21, wherein the source subscriber comprises a first subscriber and the destination is associated with a second subscriber.

28. The computer program of claim 21, wherein the communication indicates the physical address associated with the source subscriber and the virtual circuit used to receive the communication.

29. The computer program of claim 21, wherein the communication network comprises an Asynchronous Transfer Mode network and each virtual circuit is identified using a virtual path identifier and a virtual channel identifier.

30. The computer program of claim 21, wherein the physical address for each subscriber comprises a MAC address.

31. A means for controlling subscriber loops, comprising:
  a means for receiving a communication from a source subscriber using a particular one of a plurality of virtual circuits associated with a communication network, the communication identifying a destination;
  a means for storing a plurality of subscriber associations, each subscriber association specifying a physical address associated with a corresponding subscriber and one of the plurality of virtual circuits; and
  a means for forwarding the communication toward the destination if a particular subscriber association specifies the physical address of the source subscriber and the virtual circuit used to receive the communication.

* * * * *

UNITED STATES PATENT AND TRADEMARK OFFICE
CERTIFICATE OF CORRECTION

PATENT NO. : 6,665,305 B1
DATED : December 16, 2003
INVENTOR(S) : Douglas M. Weismann It is certified that error appears in the above-identified patent and that said Letters Patent is hereby corrected as shown below:

Column 12,
Line 13, after "source" delete "particular".

Signed and Sealed this

Twenty-ninth Day of June, 2004

JON W. DUDAS
*Acting Director of the United States Patent and Trademark Office*